(12) United States Patent
Angrish et al.

(10) Patent No.: US 10,205,638 B1
(45) Date of Patent: Feb. 12, 2019

(54) METHOD AND APPARATUS FOR CONFIGURING A NETWORK TOPOLOGY IN A CLOUD COMPUTING ENVIRONMENT

(71) Applicant: NS3I, LLC., San Francisco, CA (US)

(72) Inventors: Yogesh Angrish, San Francisco, CA (US); Suleman Alam, San Francisco, CA (US)

(73) Assignee: NS3I, LLC., San Francisco, CA (US)

( * ) Notice: Subject to any disclaimer, the term of this patent is extended or adjusted under 35 U.S.C. 154(b) by 876 days.

(21) Appl. No.: 14/522,537

(22) Filed: Oct. 23, 2014

Related U.S. Application Data

(63) Continuation of application No. 13/903,914, filed on May 28, 2013, now abandoned.

(51) Int. Cl.
*H04L 12/24* (2006.01)

(52) U.S. Cl.
CPC .......... *H04L 41/22* (2013.01); *H04L 41/0803* (2013.01); *H04L 41/12* (2013.01); *H04L 41/5019* (2013.01)

(58) Field of Classification Search
USPC .................................... 709/220, 217; 726/15
See application file for complete search history.

(56) References Cited

U.S. PATENT DOCUMENTS

| | | | | |
|---|---|---|---|---|
| 8,201,237 | B1 * | 6/2012 | Doane | H04L 63/0272 726/15 |
| 8,230,050 | B1 * | 7/2012 | Brandwine | H04L 45/586 709/220 |
| 8,996,691 | B1 * | 3/2015 | Stickle | H04L 12/40071 709/224 |
| 9,137,209 | B1 * | 9/2015 | Brandwine | H04L 63/0272 |
| 9,524,167 | B1 * | 12/2016 | Cohn | G06F 9/30098 |
| 9,794,116 | B2 * | 10/2017 | Brandwine | H04L 41/5051 |

* cited by examiner

*Primary Examiner* — Thanh T Nguyen
(74) *Attorney, Agent, or Firm* — Lance Kreisman; Peninsula Patent Group

(57) ABSTRACT

A computer-implemented method for configuring a network topology within a cloud computing environment is disclosed. The method includes providing a user interface (UI) to a user to configure a selection of network topology features. The UI enables the user to specify network topology features at the physical device level. Available cloud computing resources that are associated with the cloud computing environment are detected and the configured network topology is mapped to the available cloud computing resources. The user may then access the mapped cloud resources as a virtual network.

15 Claims, 18 Drawing Sheets

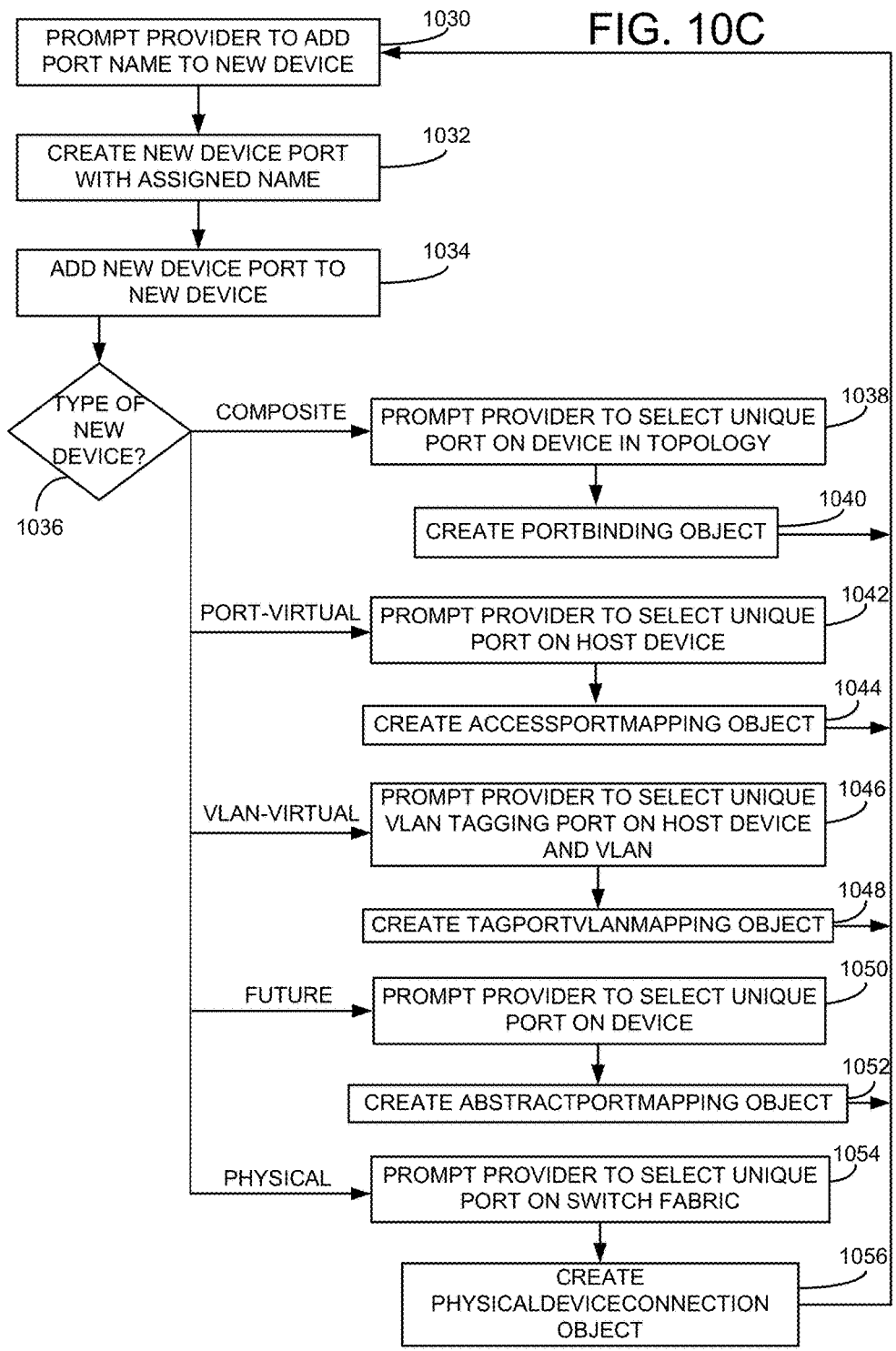

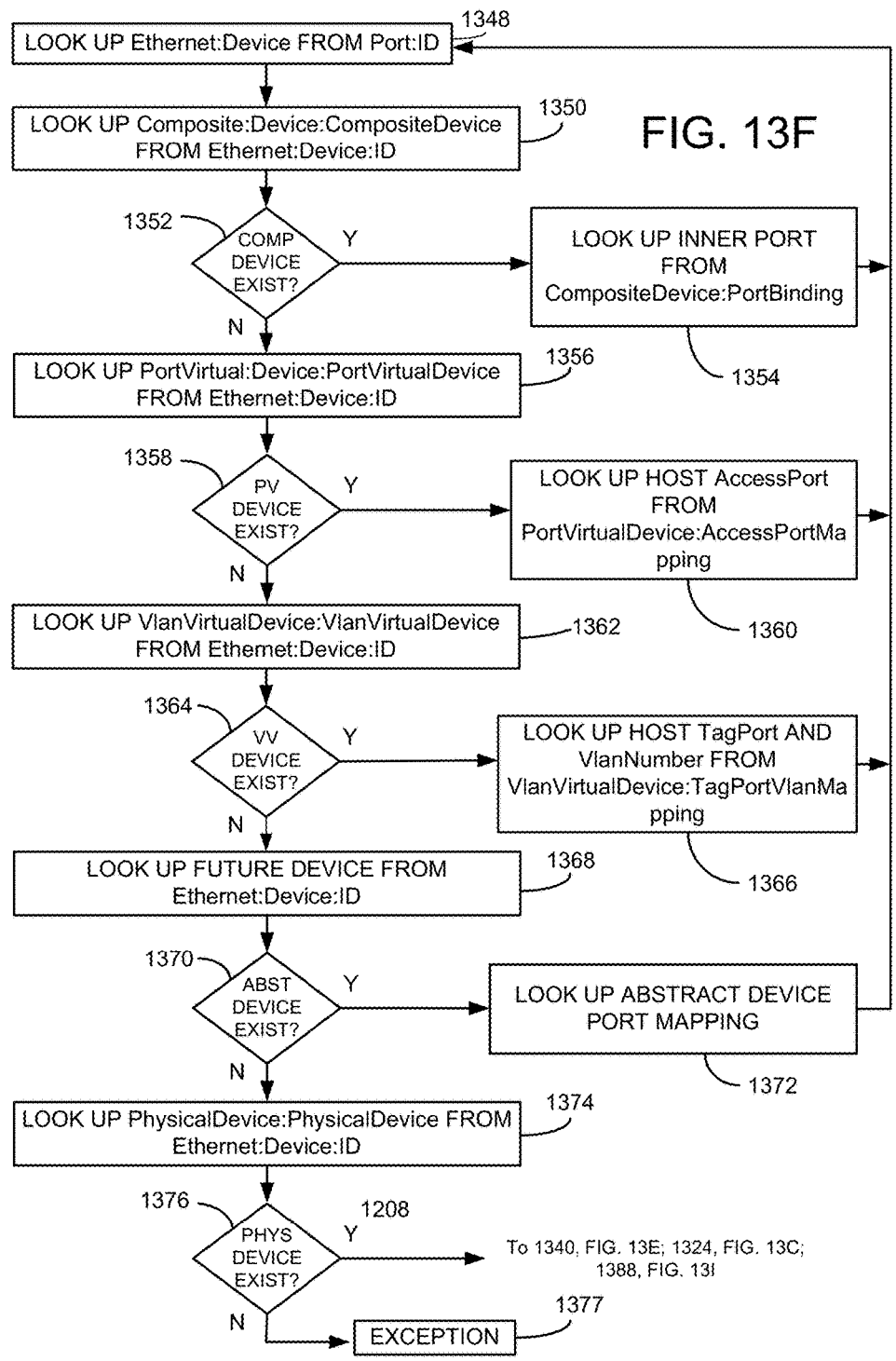

METHOD AND APPARATUS FOR CONFIGURING A NETWORK TOPOLOGY IN A CLOUD COMPUTING ENVIRONMENT

CROSS-REFERENCES TO RELATED APPLICATIONS

This application is a Continuation of U.S. application Ser. No. 13/903,914, filed May 28, 2013, and expressly incorporated by reference herein.

TECHNICAL FIELD

Examples described herein pertain generally to a system and method for configuring network topologies through the use of cloud computing resources.

BACKGROUND

Cloud computing generally involves providing computing resources (typically hardware and software) over a network as a service. From a user's perspective, up-front investments in hardware, software, and employees to maintain the network are avoided by paying for remotely located hardware and software through subscription fees. The resource provider benefits by optimizing the use of aggregated computing resources among multiple subscribers.

Conventionally, the network topologies available to a user as a virtual network are limited in configurability. Thus, a given subscriber desiring to have a virtual network matching a previous in-house physical network to optimize portability may encounter difficulties. Other issues in configuring conventional virtual networks include a lack of flexibility in being able to specify certain security policies.

What is needed and as yet unavailable is a system and method that enables users to customize virtual networks with a fine degree of granularity.

BRIEF DESCRIPTION OF THE DRAWINGS

FIG. 10C illustrates steps corresponding to one embodiment of the step of adding ports to a specific device shown in FIG. 10A.

FIG. 13F illustrates one embodiment of the find physical device port step of FIGS. 13C, 13E, and 13I.

DETAILED DESCRIPTION

Figure 1:
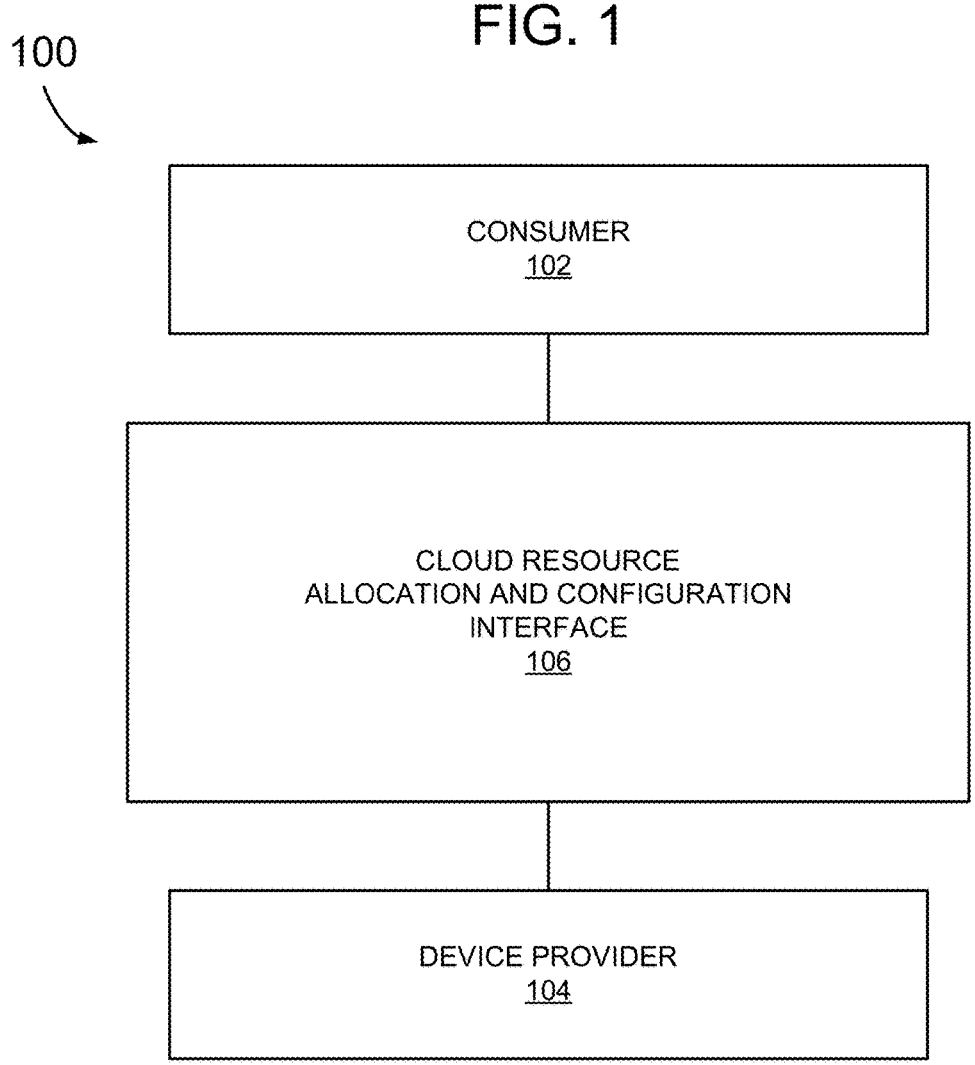
FIG. 1 illustrates one embodiment of a cloud computing marketplace with cloud computing resources interfaced with consumers via a resource provider.

Examples described herein provide a system and computer-implemented method for configuring a network topology in a cloud computing environment. The system brings together device providers and device consumers via an allocation and configuration interface. The interface enables the providers to register devices at the device level, and provides consumers the flexibility to configure virtual networks at the physical device level.

According to one example, a computer-implemented method for configuring a network topology within a cloud computing environment is disclosed. The method includes providing a user interface (UI) to a user to configure a selection of network topology features. The UI enables the user to specify network topology features at the physical device level. Available cloud computing resources that are associated with the cloud computing environment are detected and the configured network topology is mapped to the available cloud computing resources. The user may then access the mapped cloud resources as a virtual network.

According to a further embodiment, a computer-implemented method for allocating computing resources in a cloud computing environment is disclosed. The method includes detecting available computing resources associated with the cloud computing environment at the physical device level. Computing resource consumers are selectively interfaced to consumer-specified virtual networks that are based on the available computing resources at the physical device level.

In a further embodiment, a nontransitory computer-readable medium storing instructions is disclosed. The instructions, when executed by one or more processors, cause the one or more processors to provide a user interface (UI) to enable a user to configure a layer-2 network topology. Available cloud computing resources associated with a cloud computing environment are detected and the configured network topology is mapped to the available cloud computing resources. The user may then access the mapped cloud resources as a virtual network.

As used herein, a "user" may refer to an individual operating a computing device. An example of a user may include a network administrator or other individual desiring to configure a virtual network topology.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component may include a program, a sub-routine, a portion of a program, or a software component or a hardware component capable of performing one or more stated tasks or functions. As used herein, a module or component may exist on a hardware component independently of other modules or components. Alternatively, a module or component may be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples of the invention can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system, generally designated 100, that forms a cloud computing marketplace where network device providers (or service sellers) 104 make cloud computing resources available to virtual network consumers 102. According to some examples, a cloud resource interface 106 provides services to match the needs of one or more consumers to the available resources offered by the device providers. The interface 106 enables the consumers to customize a network topology with various devices, including being able to customize at the physical device level. As more fully described below, the configurability available to the consumers may involve a variety of device selections, including virtual devices and composite devices in addition to the physical devices. Connections between such devices may be thought of as network segments. A network segment may be a layer-2 or data link layer network segment. Consumers generally may create device port connections using network segments, i.e. 1) directly, using point-to-point links between any two devices; 2) through broadcast domains, such as VLANs using IEEE 802.1Q tagged or untagged frames; or 3) link aggregation, where two or more ports may be combined to form an aggregated link for increased throughput or higher availability. Thus, a customized selection of a given physical device for use in a customized virtual network may be viewed as configurability at the physical device level.

In some embodiments, the interface 106 may be implemented through software that operates on various computing platforms, such as a general-purpose computer or web-based server. System 100 can also be implemented through other computer systems in alternative architectures (e.g., peer-to-peer networks, etc.). In one embodiment, the consumer(s) 102 pay a fee to access the interface offered by the marketplace provider 106. The device owner(s) 104 receive a portion of the fee based on the usage of their device(s) in the network configured by the consumer. The marketplace provider 106 also receives a portion of the fee for bringing the consumer(s) and device seller(s) together. In this way, the computing resources aggregated under the cloud computing environment may be efficiently optimized and the cloud consumers may efficiently dictate their specific network topologies at the device level to optimize their networking needs.

With continued reference to FIG. 1, the device providers 104 generally supply the aggregate cloud computing infrastructure in the form of servers, routers, load balancers, firewalls, and the like. Devices of this type are generally viewed as physical devices. To enable consumers to specify and configure virtual networks that are mapped to the supplied physical devices, the infrastructure utilizes a scalable layer-2 protocol or solution, or a Software Defined Networking (SDN) approach. Examples of scalable layer-2 protocols or solutions include Provider Backbone Bridging (PBB), Virtual Private LAN Service (VPLS), Virtual Extensible LAN (VXLAN), and Shortest Path Bridging (SPB), etc. SPB is built on top of a link-state protocol, IS-IS, which enables layer-2 networks to scale well beyond what traditional layer-2 protocols, such as, Spanning Tree Protocol (STP) and its variants enable. In SPB, each broadcast domain or a point-to-point link is assigned a unique 24-bit service identifier, known as an I-SID. Thus, theoretically more than 16 million I-SIDs can be created allowing for very large layer-2 physical network topologies. For Ethernet devices that support 802.1Q tagging, VLANs identified by particular tags can be mapped to specific I-SIDs. Frames are transmitted between devices is enabled using source and destination MAC Addresses. In SPB by mapping switch ports and VLANs to I-SIDs, virtual networks can be created enabling consumers to customize network topologies at the network device level.

Figure 2:
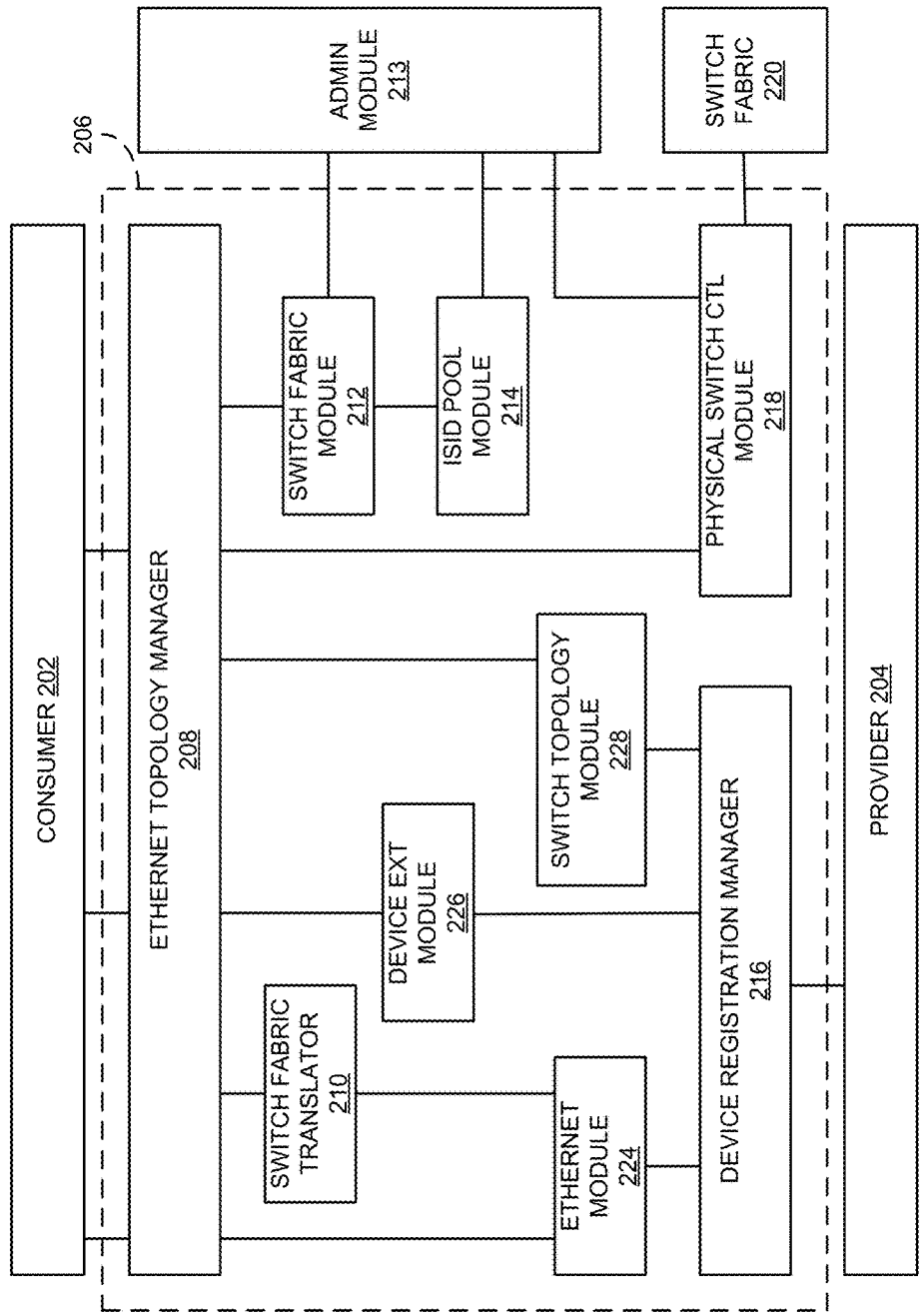
FIG. 2 illustrates a functional block diagram of one embodiment of the software and hardware employed by the resource provider of FIG. 1.

FIG. 2 illustrates one example of the system of FIG. 1, generally designated 200, including abstractions of respective consumers 202 and providers 204, and emphasis on one embodiment of an interface software architecture 206. The architecture 206 includes an Ethernet topology manager 208 that coordinates a consumers' control between topology elements and the provisioning of physical switches. The Ethernet topology manager 208 generally forms the backbone of the consumer software resources provided by the interface 206, from the consumer perspective, by enabling the consumer 202 to configure a custom network topology via a graphical user interface (GUI) utilizing physical resources supplied by one or more providers 204.

With continued reference to FIG. 2, the Ethernet topology manager 208 couples to a switch fabric translator 210 and a switch fabric module 212. The switch fabric translator 210 maintains an inventory of mappings, such as between domains and ISIDs, and point-to-point connections and ISIDs. The switch fabric module 212 maintains an inventory of switch fabric details including switches, switch connection/credential details, and ISIDs in use. Available ISIDs are listed in a table managed by an ISID pool module 214 that communicates with the switch fabric module 212. An administration module 213 interfaces with the switch fabric module 212, the ISID pool module 214, and a switch control module 218, to control various administrative operations. The switch control module 218 controls communication and configuration of plural remote physical switches that together create a switch fabric 220.

Further referring to FIG. 2, from the provider side, the interface software architecture 206 includes a device registration manager 216. The device registration manager 216 coordinates registration and de-registration of devices supplied and/or removed by the provider 204.

Additional modules provided by the interface software architecture 206 include an Ethernet module 224, a device extensions module 226 and a switch topology module 228. The Ethernet module 224 generally maintains a list of available Ethernet topology elements, including Devices, virtual Broadcast Domains (or simply Domain), virtual Point-to-Point Connections, and Topologies. The device extensions module 226 includes an inventory of extensions of abstract devices available for use by the consumer in a virtual network topology, such as physical devices, composite devices, port virtualized devices, and VLAN virtualized devices, to name but a few. The switch topology module 228 maintains an inventory of the connections of physical device ports to switch ports.

Figure 3:
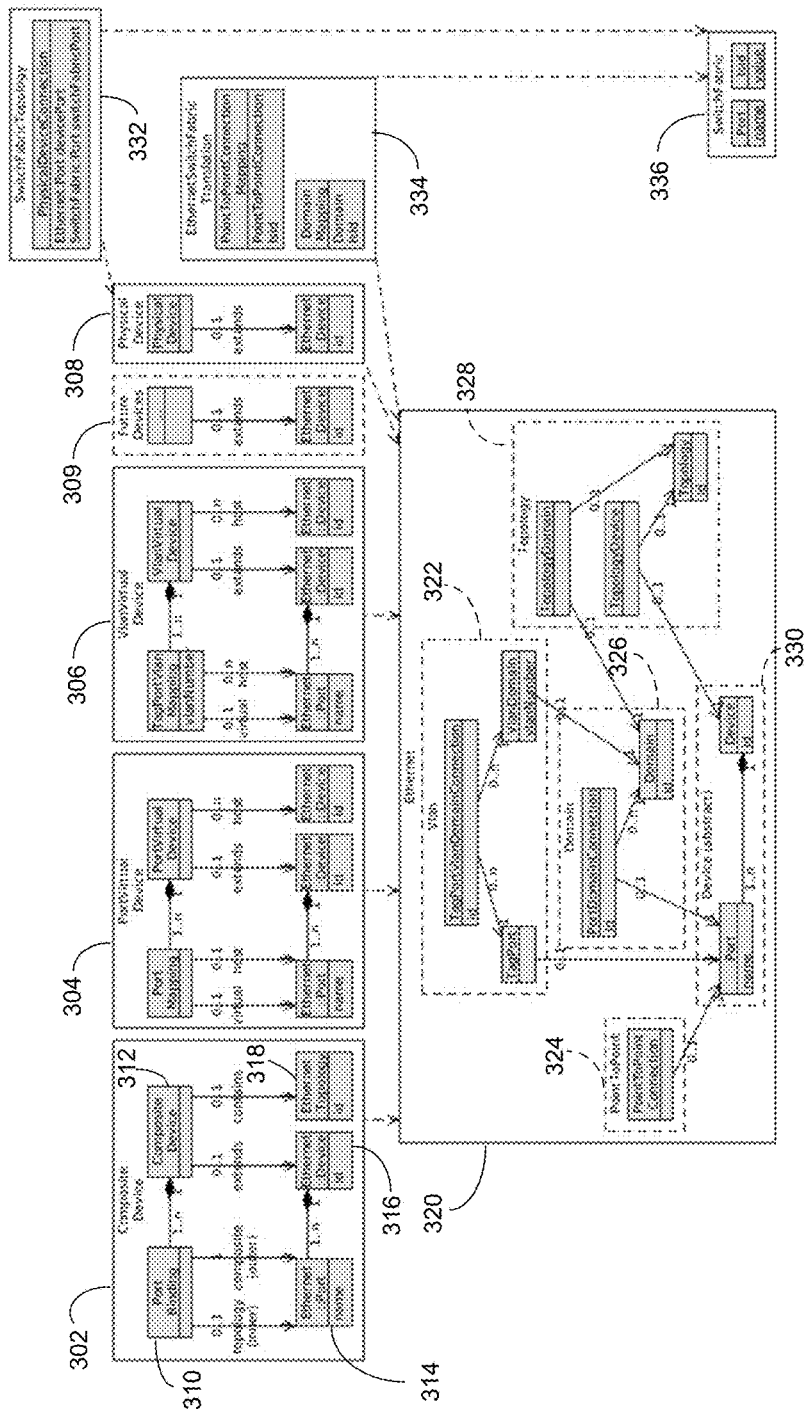
FIG. 3 illustrates one embodiment of address mapping carried out by the software and hardware of FIG. 2.

FIG. 3 illustrates one embodiment of a domain data model, generally designated 300, consistent with the interface software architecture 206 of FIG. 2. The domain data model generally reflects various domains, subdomains, objects and ID reference fields that may be associated with data components created and processed in accordance with various method steps illustrated in FIGS. 10-13I. Respective composite, port-virtual, VLAN-virtual, physical and future device objects 302, 304, 306, 308 and 309 relate to data associated with devices that may be created by a provider. Each device type may be defined by various data fields that specify, for the case of a composite device 302, a port binding identifier 310, a composite device identifier 312, and corresponding mappings to an Ethernet port name 314, Ethernet device identifier 316 and Ethernet topology identifier 318. The port-virtual, VLAN virtual, physical and future device objects may also be defined similarly and further details regarding these devices are described more fully below.

Further referring to FIG. 3, the domain data model includes an Ethernet domain 320 that includes various sub-domains such as a VLAN sub-domain 322, a point-to-point sub-domain 324, a domain sub-domain 326, a topology sub-domain 328 and a device sub-domain 330. Each subdomain may be defined by various data fields that are shown in FIG. 3, but for purposes of clarity not further described herein, except when referred to in the flowchart steps illustrated in the various FIGS. 12A-13I. Other domains are provided in the domain data model, including a switch fabric topology domain 332, an Ethernet switch fabric translation domain 334 and switch fabric domain 336.

Figure 4:
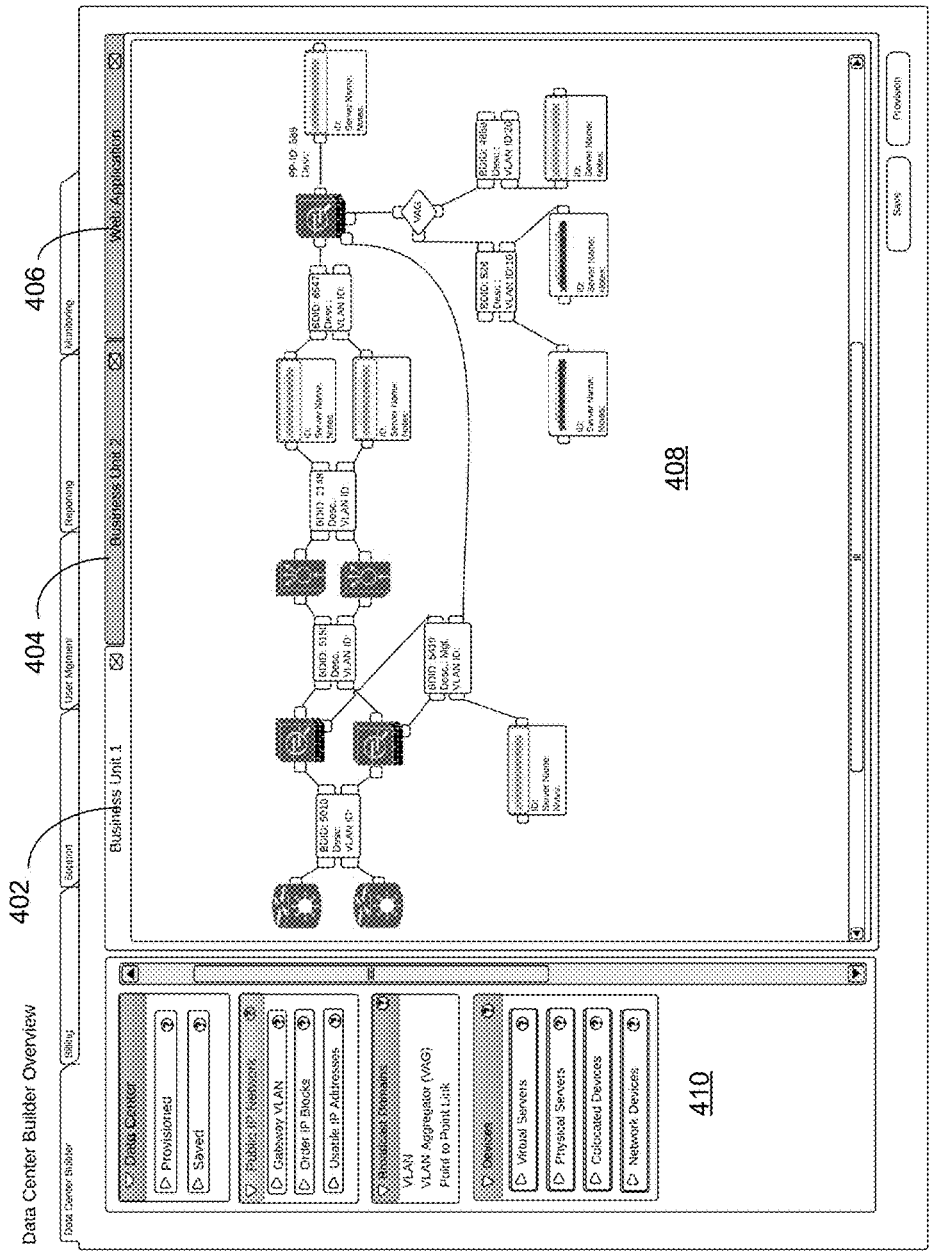
FIG. 4 illustrates one specific example of a Graphical User Interface (GUI) generated by the software and hardware of FIG. 2 for users to customize a network topology.

The software architecture 206 and data model of FIGS. 2 and 3 enable respective providers 204 and consumers 202 to straightforwardly register and configure physical and virtual network devices in a cloud computing environment utilizing, for example, a comprehensive graphical user interface (GUI). Other user interfaces are envisioned, including an Application Programming Interface (API) that may serve as a root interface mechanism for a GUI. Additionally, a web-based tabular interface may be utilized that relies on the API. Further, users of the system may interface programmatically using the API directly. One example of a graphical user interface (GUI) screen is illustrated in FIG. 4. The particular screen shown is an example of a configuration screen that a consumer may use to specify individual network devices for connection in a given virtual network topology. In the example shown, the virtual network being configured relates to a "Business Unit 1" network, to be separate and independent from other virtual networks due to, for example, various security-related protocols and the like. Various tabs 402, 404 and 406 allow the user to configure separate virtual networks for different areas of a business or other organization. A topology workflow window 408 graphically illustrates abstracted individual device connections in the network as connected by the user. Actual connections within the physical computing resources are transparent to the user, and mapped by the interface software architecture.

Further referring to FIG. 4, a device selection window 410 illustrates selection buttons for the user to select. Once selected, respective images of various devices are shown, and the user may drag and drop one or more of the device images from the opened window into the workflow window 408. Connections between defined ports may be made by establishing paths between respective ports, such as through an input selection device like a mouse or other screen selection device.

Figure 5:
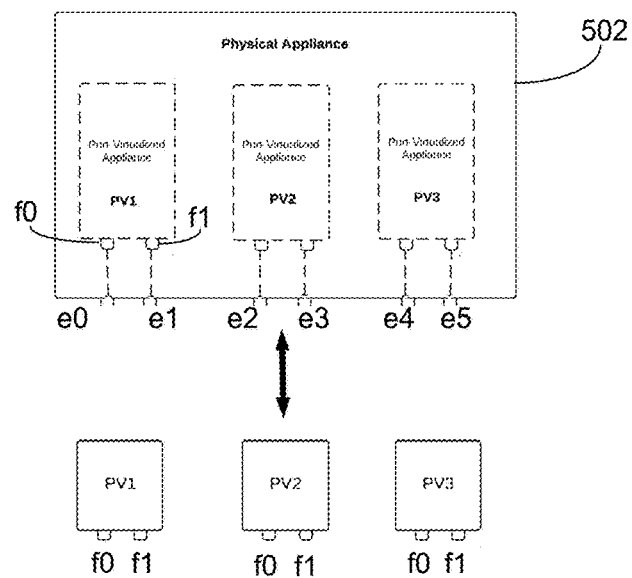
FIG. 5 illustrates an example of a port-virtualized device created from a single physical device.

FIGS. 5-8 illustrate further detail relating to various network devices that may be selected by the user via the GUI screen of FIG. 4. Generally, devices can be virtualized on a network in multiple ways. One method is to virtualize by way of allocating different ports on a host device to different virtual devices. This form of virtual device is called a port-virtualized device, and is illustrated in FIG. 5. A port on the host device that is allocated to a particular port-virtualized device may generally not be allocated to another port-virtualized device.

Referring to FIG. 5, a single physical device 502 is shown with six ports: e0, e1, e2, e3, e4, and e5. Port-virtualized devices PV1, PV2 and PV3 each have pairs of ports f0/f1, f2/f3, and f4/f5 which are mapped to unique ports on the parent physical device 502. The individual port-virtualized devices, PV1, PV2, and PV3 may then be identified to the consumer as available resources that may be included in a custom network topology.

Figure 6:
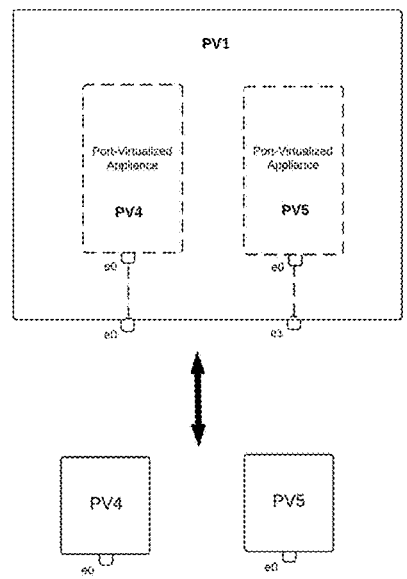
FIG. 6 illustrates an example of a port-virtualized device created from a single virtual device.

In some embodiments, after a consumer consumes one of the port-virtualized devices of FIG. 5, the consumer may act as a provider and further virtualize the device and offer it in the system for another party to consume. When employed in the business marketplace relating to the system of FIG. 1, the creator of the port-virtualized device may realize revenue from the consumption of the device by another subscribing consumer. FIG. 6 illustrates how port-virtualized device PV1 of FIG. 5 may be further partitioned into port-virtualized devices PV4 and PV5 (FIG. 6), each with one port. Any device, whether physical, composite or virtual, may be port-virtualized, provided the device supports virtualization or segmentation, and the number of ports is greater than one.

Another method of virtualizing a device is by segmenting the same port on the host device using VLAN tagging or trunking. This type of virtual device is called a VLAN-virtualized device. All VLAN-virtualized devices can use the same physical port enabled with VLAN tagging. However, each virtual device port will be mapped to a unique VLAN on a physical port of the host device.

Figure 7:
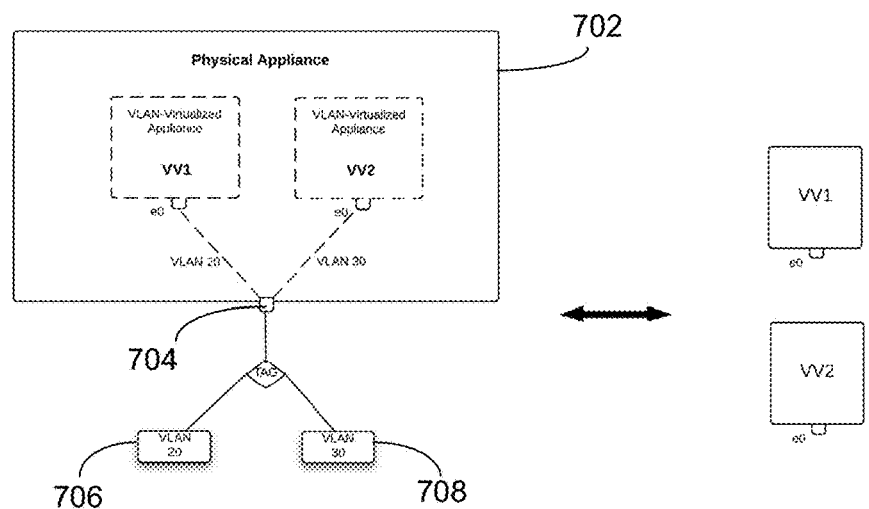
FIG. 7 illustrates an example of a VLAN-virtualized device created from a single physical device.

FIG. 7 illustrates one example of a VLAN-virtualized device. As explained above, with VLAN-virtualized devices, the same physical port on the parent physical device is used with multiple VLAN-virtualized devices. A physical device 702 with a physical port 704 is partitioned into two VLAN-virtualized devices VV1 and VV2. In one embodiment, the port 704 is segmented using a VLAN tagging protocol consistent with IEEE 802.1Q. The consumer of the physical device may configure the network topology such that the one physical port 704 is enabled for VLAN tagging, and two VLANs 706 and 708 are configured with separate VLAN IDs.

Similar to the port-virtualized devices of FIG. 5, after the consumer consumes the VLAN-virtualized devices VV1 and VV2, the devices may be made available to other consumers. For some embodiments, only devices with VLAN-tagged ports can be VLAN-virtualized, such as physical, port-virtualized and composite devices.

In one embodiment, users configuring their network topology may create composite devices. A composite device is a device that is realized by one or more physical, virtual, or other composite devices. Configured composite devices may be offered in the system as a specialized device, and made available to other consumers.

Figure 8:
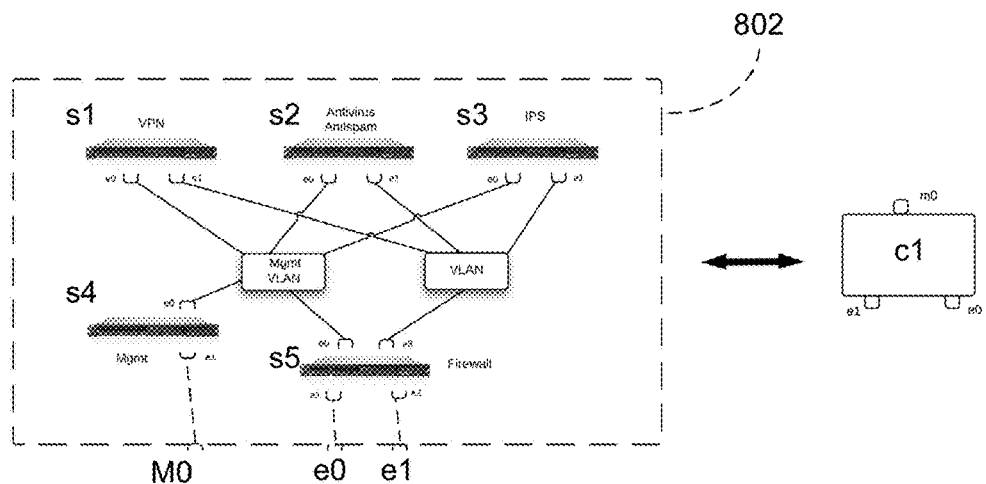
FIG. 8 illustrates an example of a composite device created from individual physical devices.

FIG. 8 illustrates a specific example of a composite device 802. Five physical servers S1, S2, S3, S4, and S5 are connected in a topology to create a single composite device C1. Three ports S4.e1, S5.e1 and S5.e2 from different devices S4 and S5 are exposed as ports M0, e0 and e1 of the composite device. Multiple devices in an example such as this, abstracted as a single device, may provide different security applications such as Firewall, VPN, IPS, antivirus and anti-spam.

Figure 9:
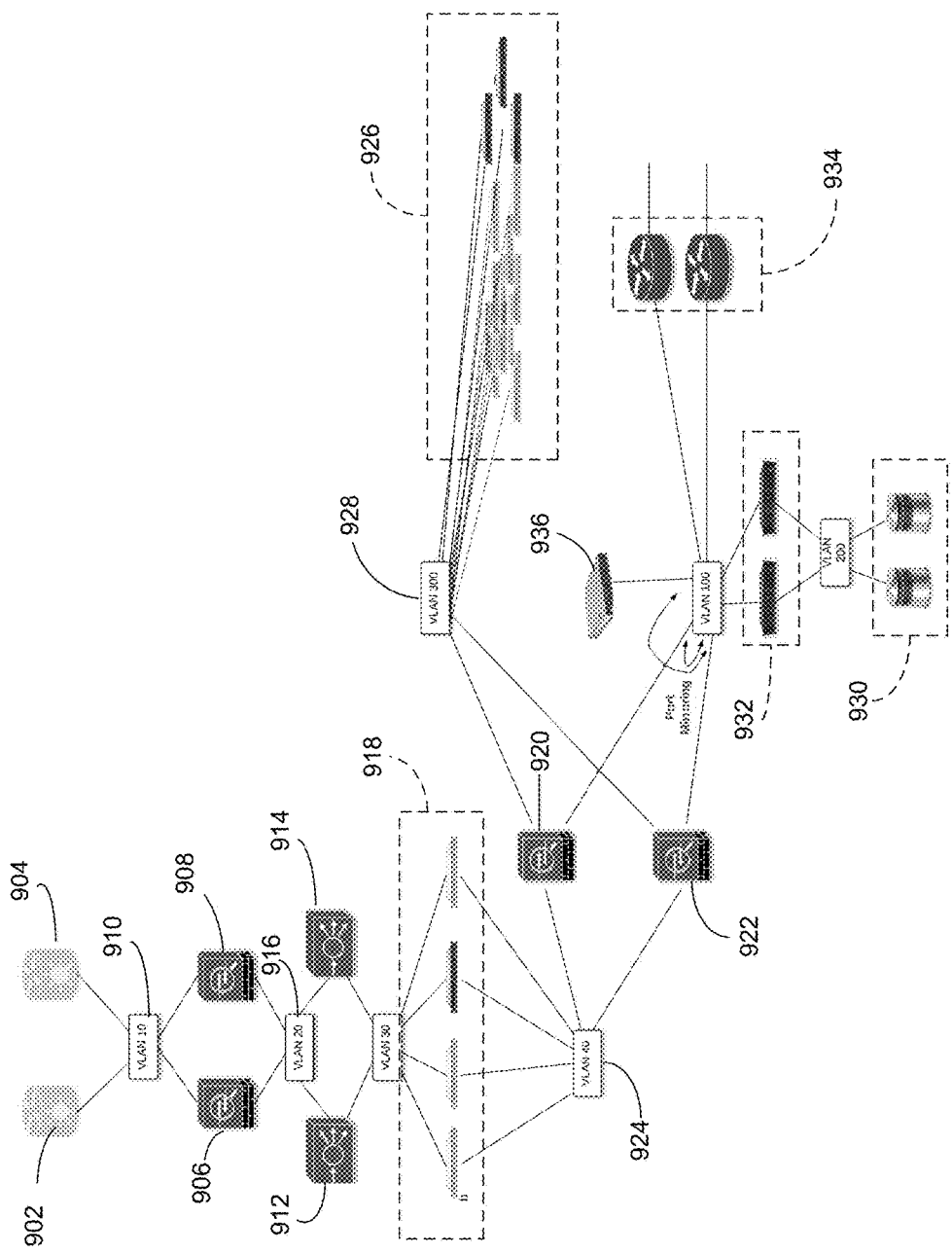
FIG. 9 illustrates an example of a customer-configured virtual network topology created using the GUI of FIG. 4 that includes VLAN tagging.

One example of a complete virtual network topology that may be created by a user at the network segment level using the software architecture of FIG. 2 is shown in FIG. 9. Various functions may be separated from each other by strategically placed broadcast domains. Thus, gateway routers 902 and 904 are shown coupled to a pair of redundant dedicated or virtual firewalls 906 and 908 via VLAN 910. Load balancers 912 and 914 interface with the firewalls via VLAN 916. A virtual or dedicated server farm 918 is employed and separated from a second pair of firewalls 920 and 922 by VLAN 924. A virtual server cluster 926 interfaces with the firewall through VLAN 928. Dedicated cloud storage 930 and database servers 932 are also provided. A cloud bridge 934 and intrusion prevention system 936 round out the high-level topological features of the configuration shown in FIG. 9. This is but one example of a customized virtual network that a consumer may configure based on the specific device level selections provided by the software interface architecture disclosed herein.

Methodology

Figure 10A:
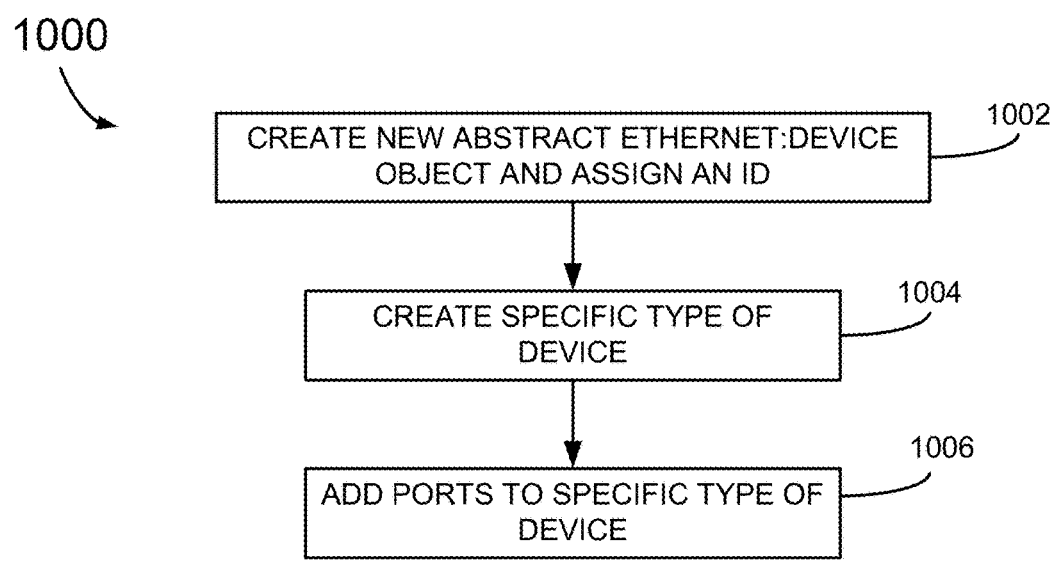
FIG. 10A illustrates a flowchart of steps that represent one embodiment of a method of registering devices with the interface of FIG. 2.
Figure 10B:
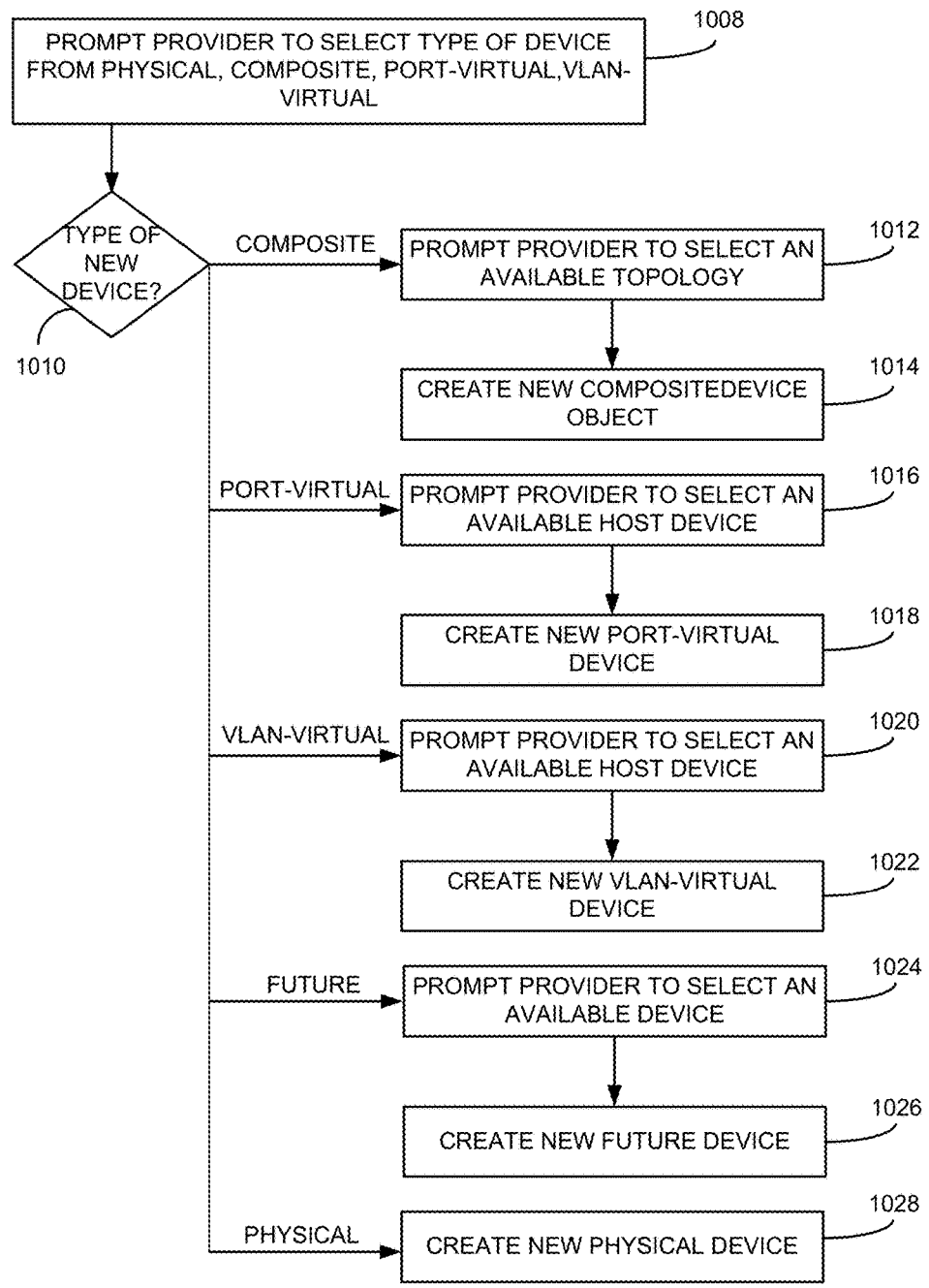
FIG. 10B illustrates steps corresponding to one embodiment of the step of creating a specific type of device of FIG. 10A.

FIG. 10A illustrates a flowchart that includes steps defining one embodiment of a method of registering devices with the interface architecture of FIG. 2. A seller or provider of computing devices having selected to register a device will result in the system, at 1002, to create a new abstract Ethernet:Device object, and assign an ID. The provider may create a specific type of device, at 1004. Further details relating to this step are shown in the flowchart of FIG. 10B. The provider may also add ports to a specific type of device, at 1006. Further details relating to this step are provided in the flowchart of FIG. 10C, and explained below.

Referring now to FIG. 10B, creating a specific device may involve prompting the provider to select the type of device from a physical, composite, port-virtual, VLAN-virtual, or future device, at 1008. A "future" device relates to a future device extension for the software architecture. At 1010, the user may be prompted to select the type of device to create. For a composite device, the provider is prompted to select an available topology, at 1012, and in response, the software creates a new composite device object, at 1014. For a port-virtual device selection, the provider may be prompted to select an available host device, at 1016, and in response, the software creates a new port-virtual device, at 1018. A VLAN-virtual selection causes the software to prompt the provider to select an available host device, at 1020, and the software creates the new VLAN-virtual device, at 1022. For an abstract device selection, the provider may be prompted to select whatever abstract device is available, at 1024, and create the new abstract device, at 1026. Should the provider select a physical device for creation, the software creates the physical device, at 1028.

Once the specific device is created, ports may be added to the newly created device in one implementation using the steps shown in FIG. 10C, which correspond to an example of the add ports step 1006 of FIG. 10A. At 1030, the software prompts the provider to add a port name to the newly created device. A new device port is then created with an assigned name, at 1032. The new port may then be assigned to the new device, at 1034. The software then determines the type of new device. For a composite device, the provider may be prompted to select a unique port on the device in the topology, at 1038. A port binding object may then be created, at 1040. For a port-virtual device, the provider may be prompted to select a unique port on the host device, at 1040, then the software creates an access port mapping object, at 1044. IN the case of a VLAN-virtual device, the provider may be prompted to select a unique VLAN tagging port on the host device and VLAN, at 1046, and the software creates a tag port mapping object, at 1048. A future device selection results in the provider being prompted, at 1050, to select a unique port on the future device, and creating a future port mapping object, at 1052. For a physical device, the provider may be prompted to select a unique port on the switch fabric, at 1054, and the software creates a PhysicalDeviceConnection object, at 1056.

Figure 11:
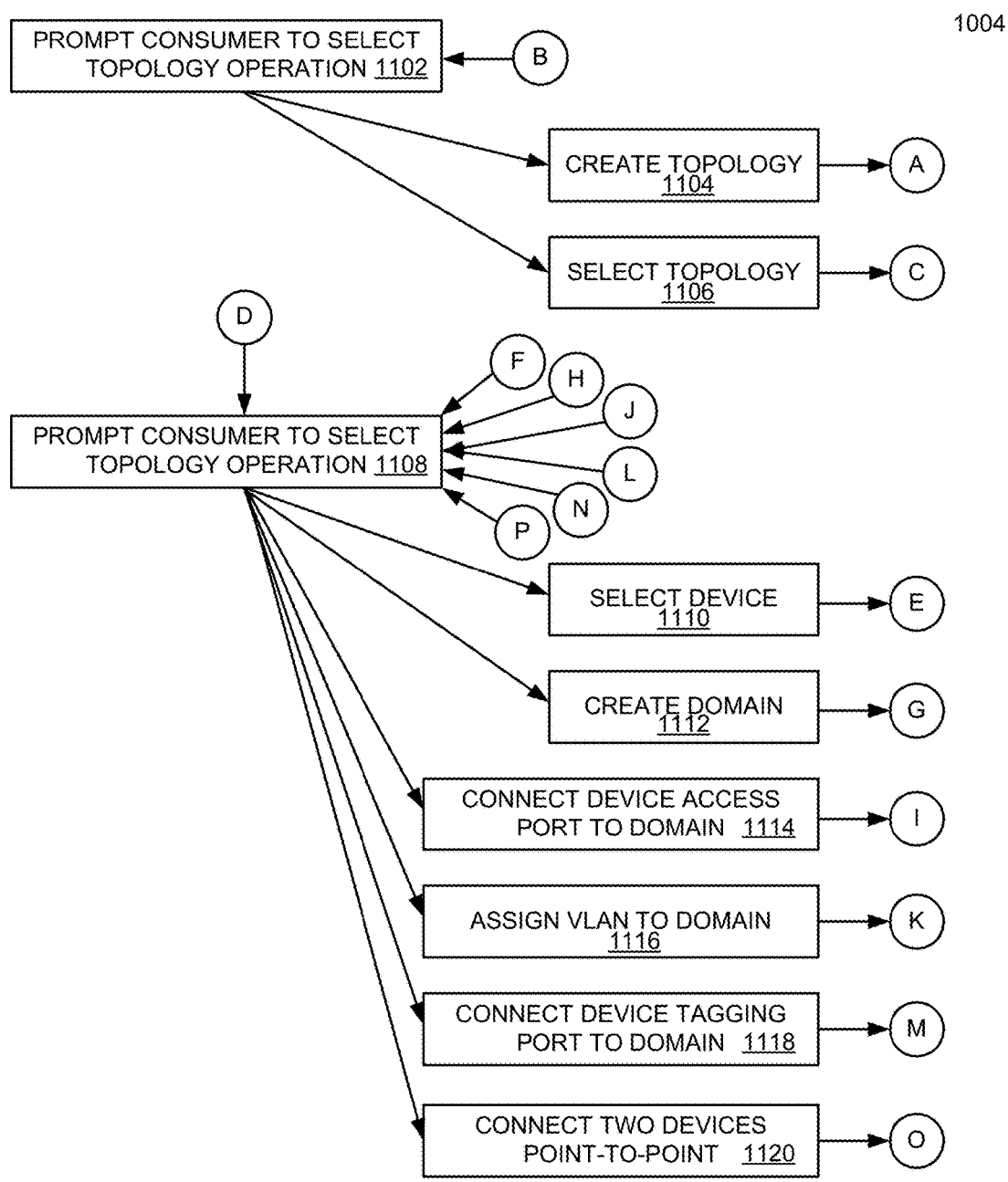
FIG. 11 illustrates a flowchart of steps that represent one embodiment of a method for creating a virtual topology utilizing the devices registered by the method of FIG. 10 and using the interface of FIG. 2.

With devices being registered with the interface in accordance with the registration method of FIGS. 10A-10C, virtual network topologies may be configured using the interface of FIG. 4 in accordance with one embodiment of a method defined by the steps of FIG. 11. A given user may be first prompted to select a particular high-level topology operation, at 1102, such as to create a topology, at 1104, or select a topology, at 1106.

Figure 12A:
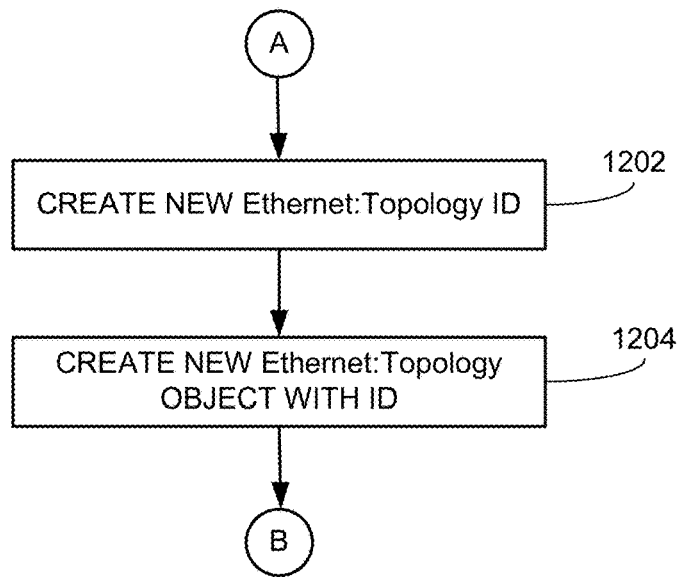
FIG. 12A illustrates a flowchart showing further detail associated with one embodiment of the create topology step of FIG. 11.

Referring to FIG. 11, should the user desire to select "create topology", at 1104, a process flow through bubble "A" is carried out, shown in FIG. 12A, that involves creating a new data identifier for the newly created topology "Ethernet:Topology", at 1202, and creating a new data object with the new ID, at 1204. Once the object with the ID is created, the process flow may return to the initial prompt step, at 1102, via return bubble "B". Note that for FIGS. 12A-13F, many of the data identifiers, objects and domains relate to the identifiers, objects and domains defined in the domain data model of FIG. 3.

Figure 12B:
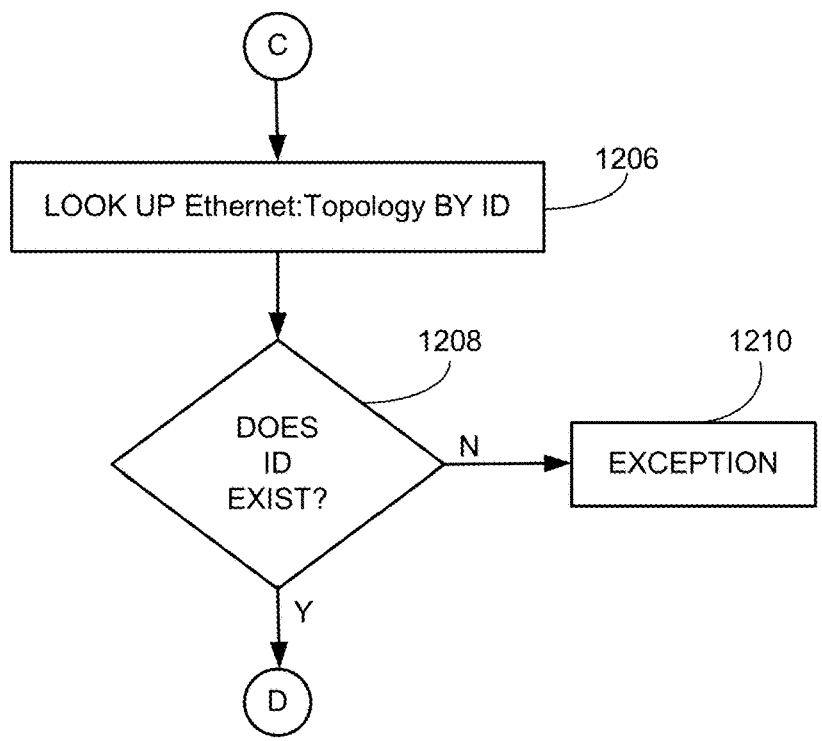
FIG. 12B illustrates a flowchart showing further detail associated with one embodiment of the select topology step of FIG. 11.

Further referring to FIG. 11, should the user initially decide to select the "select topology" option, at 1106, for one embodiment, the user may select a GUI-displayed topology identifier, and the process flow proceeds to FIG. 12B via bubble "C." In response to the ID selection, the interface software looks up the given ID, defined by an identifier such as "Ethernet:Topology", at 1206, and determines whether the ID exists, at 1208. If not, then the process flow halts in an exception, at 1210. If so, then control is passed to the user, via bubble "D", to allow the user to select a particular topology operation, at step 1108 (FIG. 11).

Returning to FIG. 11, in one embodiment, the user may select from a variety of topology operations including i) selecting a device, at 1110; ii) creating a domain, at 1112; iii) connecting a device access port to a domain, at 1114; iv) assigning a VLAN to a domain, at 1116; v) connecting a device tagging port to a domain, at 1118; and vi) connecting two devices point-to-point, at 1120. Further operations may be provided depending on the application at hand and associated computing resource constraints.

Figure 13A:
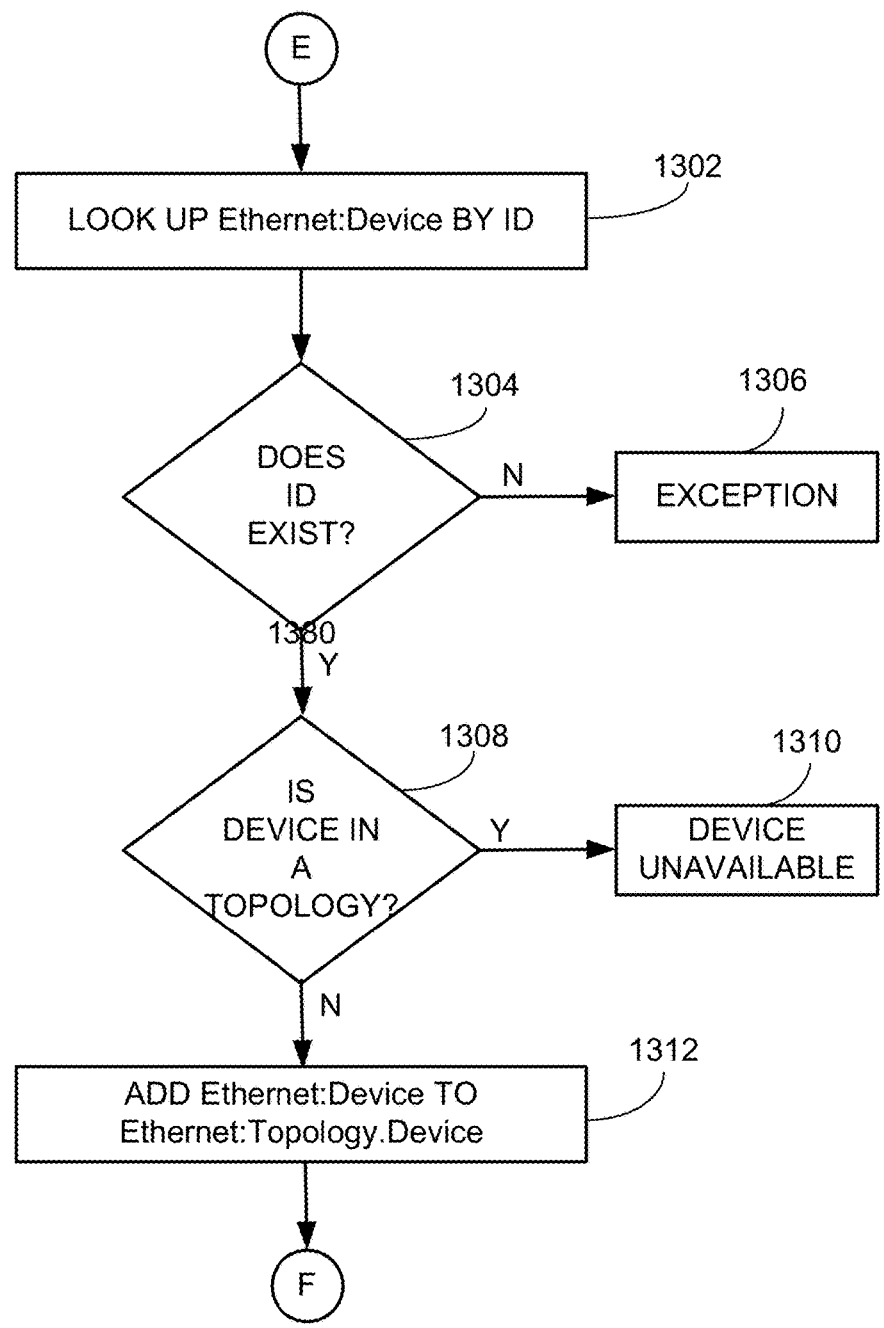
FIG. 13A illustrates a flowchart showing further detail associated with one embodiment of the select device step of FIG. 11.

Further referring to FIGS. 11 and 13A, should a user choose the "select device" operation, at 1110, the user may select one from an allocated list of devices displayed via the GUI and process flow in one embodiment may proceed via bubble "E", to FIG. 13A. In response to the selected device, the interface software looks up the selected device ID, identified in one embodiment by "Ethernet:Device", at 1302, and determines whether the ID exists, at 1304. If not, then the process flow hafts in an exception, at 1306. If so, then a further determination is made as to whether the selected device is already in a topology, at 1308. If it is, then the device is deemed unavailable, at 1310. If the device is not already assigned to a network topology, then the ID is added to a list of devices (defined, for example, by "Ethernet:Topology.Device") allocated to the new network topology. Once added, the process flow returns to the select topology operations prompt, at 1108 (FIG. 11) via bubble "F".

Figure 13B:
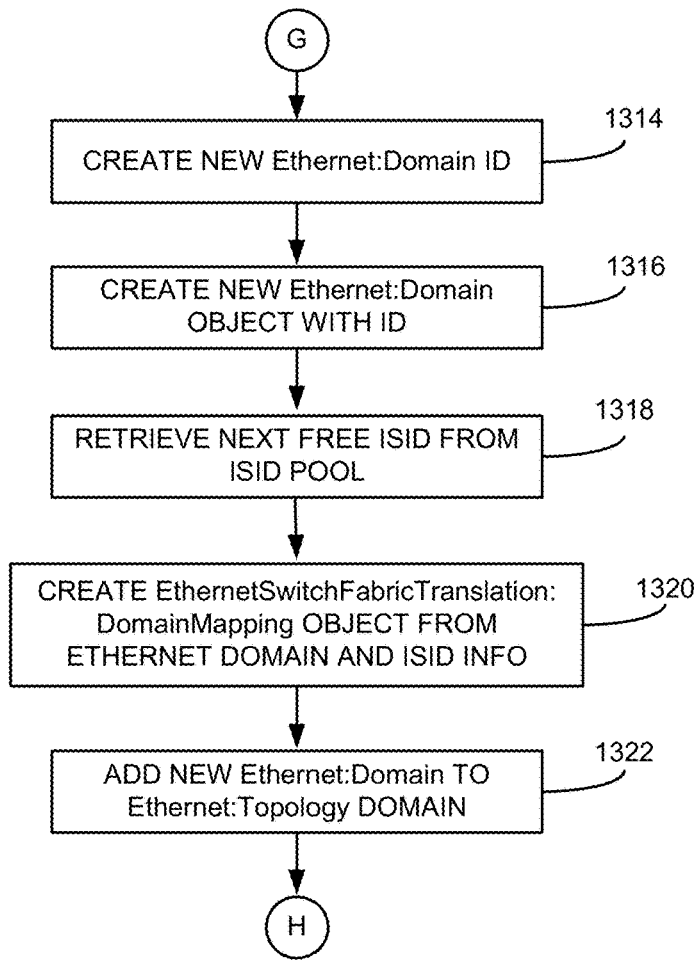
FIG. 13B illustrates a flowchart showing further detail associated with one embodiment of the create domain step of FIG. 11.

With reference to FIGS. 11 and 13B, should a user select the "Creak Domain" operation, at 1112, one embodiment of the process flow proceeds via bubble "G", to FIG. 13B. The interface software creates a new domain ID, "Ethernet:Domain", at 1314, and a corresponding object with the ID, at 1316. The next free ISID is then retrieved from the ISID pool module, at 1318. Using the created object, the ID, and the retrieved ISID, a domain mapping is carried out and maintained as an object such as "EthernetSwitchFabricTranslation:DomainMapping" (FIG. 3), at 1320. The newly created domain is then added to the Ethernet topology domain, at 1322. Once added, the process flow returns to the select topology operations prompt, at 1108 (FIG. 11), via bubble "H".

A further operation that may be selected from the operation prompt, at 1108, is to "Connect a Device Access Port to a Domain", at 1114. One embodiment of the relevant operation steps is shown in FIG. 13C via bubble "I". At 1324, the software finds the physical device port corresponding to the abstract device port. Further steps for one implementation of this step are found in the flowchart of FIG. 13F. The switch fabric port is then configured corresponding to the physical device port, at 1326. This step is further defined in FIG. 13H. An Ethernet port domain connection "Ethernet:PortDomainConnection" is then created, at 1328. The process flow may then revert back to the topology selection prompt, at 1108 (FIG. 11), via bubble "J".

Figure 13D:
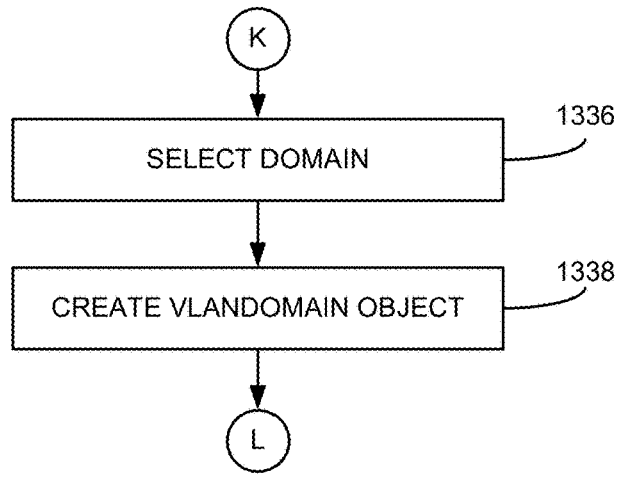
FIG. 13D illustrates a flowchart showing further detail associated with one embodiment of the assign VLAN to domain step of FIG. 11.
Figure 13C:
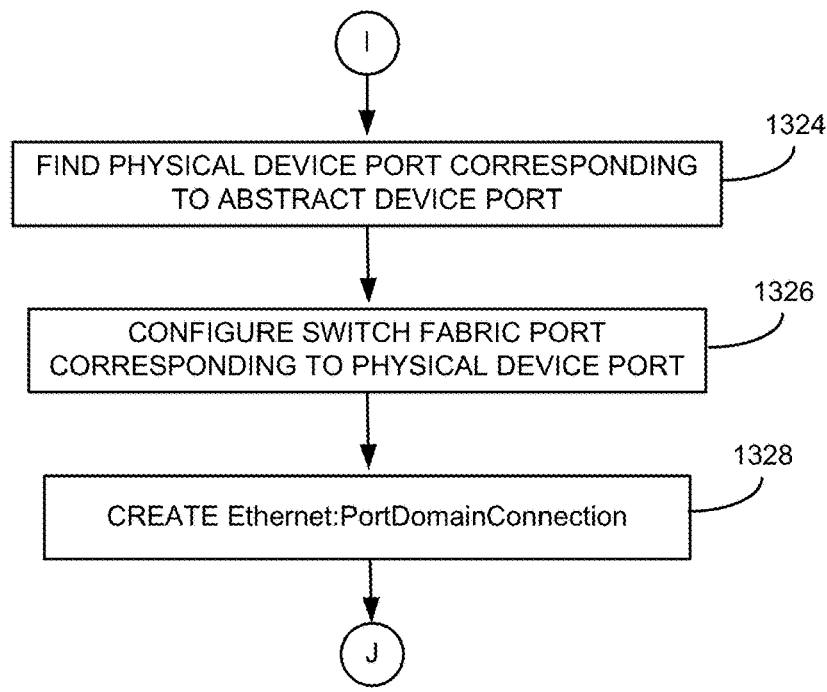
FIG. 13C illustrates a flowchart showing further detail associated with one embodiment of the connect access port to domain step of FIG. 11.

With reference to FIGS. 11 and 13D, a user desiring to assign a VLAN to a given domain, at 1116, may be prompted to select a domain, at 1336 (via bubble "K"). A VLANDomain object may then be created, at 1338. Operational flow may then return to the select topology menu, at 1108, via bubble "L".

Figure 13E:
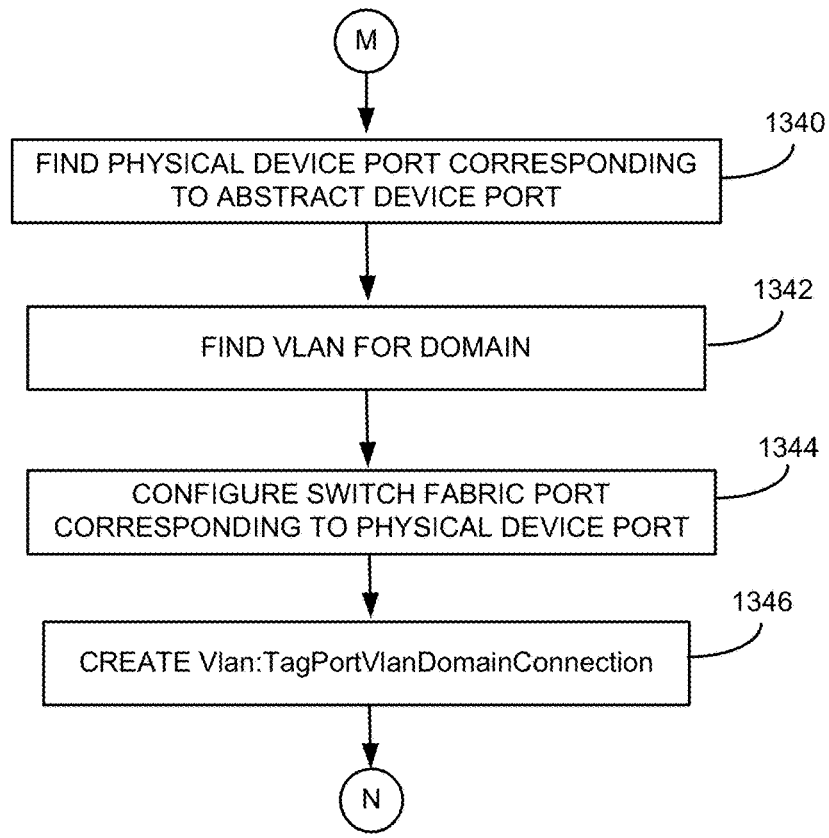
FIG. 13E illustrates a flowchart showing further detail associated with one embodiment of the connect device tagging port step of FIG. 11.
Figure 13G:
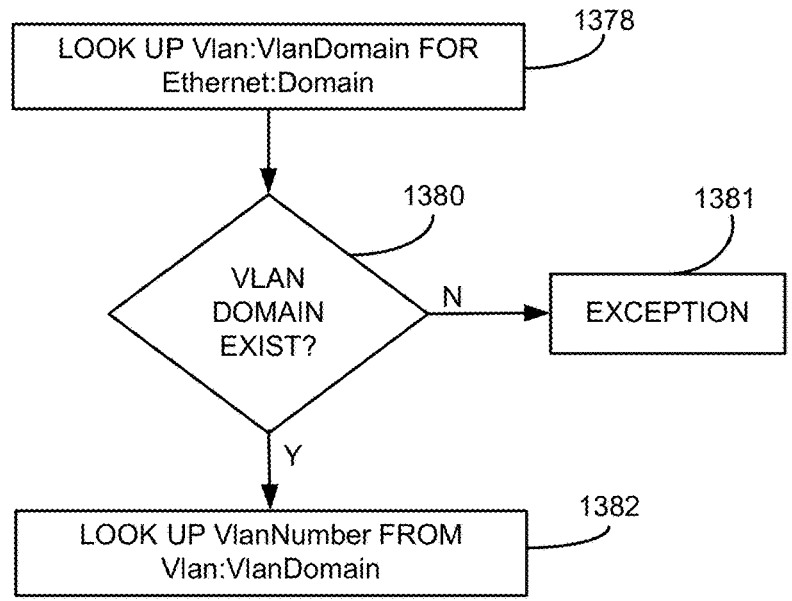
FIG. 13G illustrates one embodiment of the find VLAN domain step of FIG. 13E.

To connect a device tagging port to a given domain, the user may select the operation corresponding to the desired connection, at 1118, with the process flow for one embodiment reflected in the steps shown in FIG. 13E, via bubble "M". Once the operation is selected by the user, the software finds the physical device port corresponding to the abstract device port, at 1340. Further steps for one implementation of this step are found in the flowchart of FIG. 13F. A search to find the VLAN for the domain is then carried out, at 1342. One implementation of this step is shown in the flowchart of FIG. 13G. The switch fabric port is then configured corresponding to the physical device port, at 1344. Further steps for one implementation of this step are set forth in FIG. 13H. A connection between the VLAN tag and VLAN domain "VLAN:TagPortVlanDomainConnection" is then created, at 1346. The process flow then reverts back to the topology selection menu, at 1108, via bubble "N".

Referring now to FIG. 13F, one specific implementation of the step finding a physical device port (step 1324 of FIG. 13C, 1340 of FIG. 13E, and 1388 of FIG. 13I) includes looking up the Ethernet device ID, at 1348. A sequence of lookups for the device types may then be carried out, beginning with looking up a composite device ID from the Ethernet ID, at 1350, and determining whether a composite device exists, at 1352. IF so, then operation flows to looking up an inner port from the object "CompositeDevice:PortBinding", at 1354, then reverting back to the look-up step at 1348. If a composite device doesn't exist, a look-up for a port-virtual device is carried out, at 1356, and a determination made as to whether a port-virtual device exists, at 1358. If so, then the host access port is looked-up, at 1360. If not, then respective VLAN-virtual device and future device lookups are carried out at steps 1362 and 1368, with corresponding determinations made as to whether the VLAN-virtual and future devices exist, at 1364 and 1370. Corresponding lookups are carried out at steps 1366 and 1372 depending on whether the VLAN-virtual or future devices exist. These steps are repeated recursively for each port looked up until no non-physical device is found in the chain of mappings. Then the software looks up whether the device is a physical device, at 1374. A determination is then carried out, at 1376, as to whether a physical device exists.

Figure 13H:
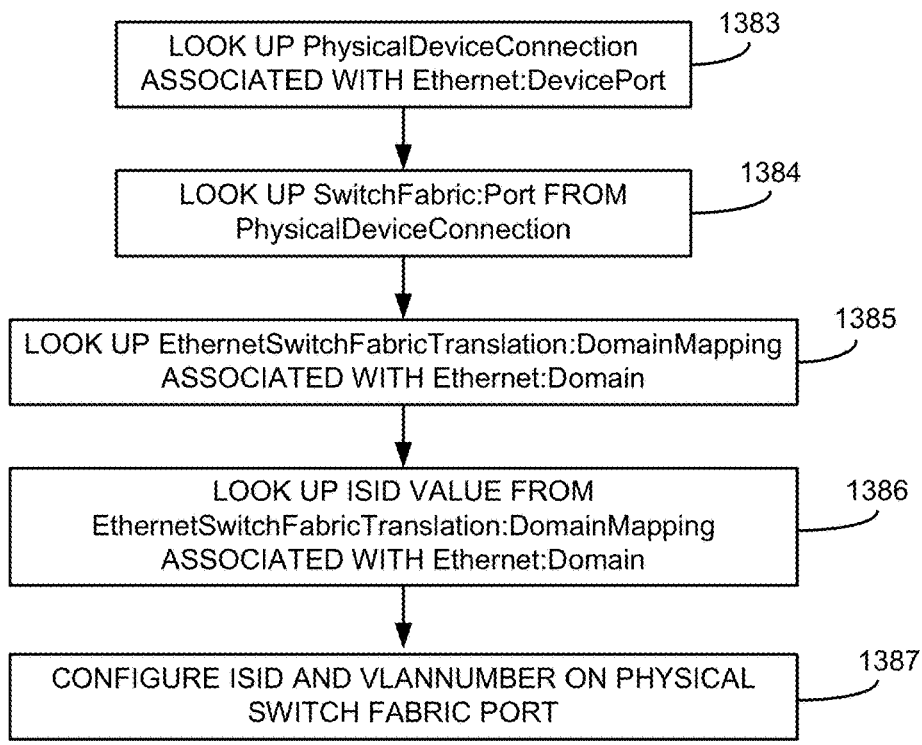
FIG. 13H illustrates one embodiment of the Configure switch fabric port step of FIG. 13E.
Figure 13I:
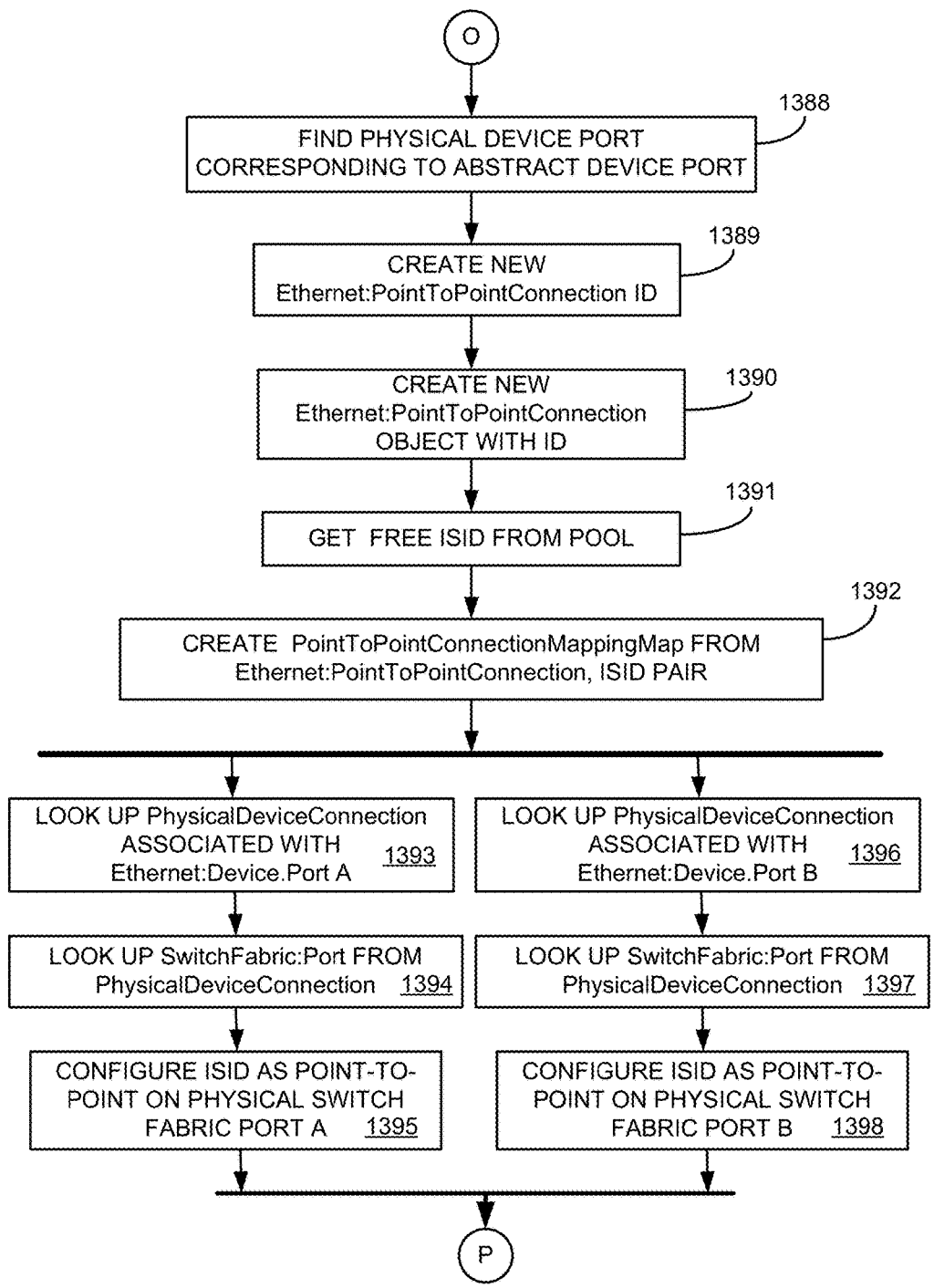
FIG. 13I illustrates a flowchart showing further detail associated with one embodiment of the connect point-to-point devices step of FIG. 11.

If so, then operation returns to step 1324 of FIG. 13C, 1342 of FIG. 13E, or 1389 of FIG. 13I, depending on where it was called from. If not, then an exception flag is generated, at 1377.

With reference to FIG. 13G, further detail regarding one implementation of the finding VLAN step (step 1342, FIG. 13E) involves looking up the VLAN domain information "Vlan:VlanDomain", at 1378, and determining whether the VLAN domain exists, at 1380. If the domain doesn't exist, an exception flag is generated, at 1381. If the domain exists, then the VLAN number "VlanNumber" is looked up from the VLAN domain information, at 1382.

FIG. 13H illustrates one implementation of the configure switch fabric port step (step 1326 of FIG. 13C or 1344 of FIG. 13E). At 1383, the software looks up the physical device connection "PhysicalDeviceConnection" associated with the Ethernet device port "Ethernet:DevicePort". The switch fabric port "SwitchFabric:Port" is then looked up from the physical device connection information, at 1384. The Ethernet switch translation domain mapping information associated with the Ethernet domain is then looked-up, at 1385. The software then looks up the ISID value from the mapping information, at 1386, and the ISID and VLAN number configured on the physical switch fabric port, at 1387.

Referring to FIGS. 11 and 13I, a further operation available to a user in configuring a network topology involves connecting two devices in a point-to-point configuration, at 1120. FIG. 13I ties in with step 1120 via bubble "O". The steps include finding for each of the two physical device ports the corresponding abstract device port, at 1388. The steps for this are further defined in FIG. 13F. The software then creates a new connection identifier for the point-to-point connection "Ethernet:PointToPointConnection", at 1389, and an associated object with the created ID, at 1390. A free ISID is then retrieved, at 1391, and a mapping "PointToPointConnectionMappingMap" created between the connection ID and the ISID, at 1392. The software may then look up the physical device connection associated with the Ethernet device port A, at 1393. At 1394, the switch fabric port from the physical device connection is looked up, followed by a configuring of the ISID as a point-to-pint connection on the physical switch fabric port A. Similar look-up and configuring steps for the second device port B are carried out concurrently with the port A steps at 1396, 1397, and 1398. The process flow may then revert back to the topology selection step 1108 (FIG. 11), via bubble "P".

Those skilled in the art will appreciate that the embodiments described herein provide a unique way to register computing devices in a cloud computing environment, and allocate those devices among virtualized networks created by consumers having the ability to configure at the physical device level. Having these capabilities may allow the consumers to achieve cost advantages by being able to create customized virtual networks that match up well with existing physical networks, thereby easing porting constraints.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the invention is not limited to those precise examples. As such, many modifications and variations will be apparent to practitioners skilled in this art. Accordingly, it is intended that the scope of the invention be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A computer-implemented method for configuring a network topology within a cloud computing network, the method comprising:

providing an application programming interface (API) based user interface (UI) to a user to configure a selection of network topology features to define a configured network topology, the UI to enable the user to specify network topology features at the physical device level;

detecting, by the UI, available physical computing resources provisioned by at least one provider for access via the cloud computing network;

mapping, by the UI, the configured network topology to the available physical computing resources in accordance with a scalable Layer-2 protocol;

providing the user access to the mapped physical computing resources as a virtual network; and wherein the network topology is based on a preexisting network topology associated with a preexisting virtual network, and the UI enables a user to modify the network topology dynamically.

2. The method of claim 1, wherein the UI further enables the user to specify network topology features at the virtual device level.

3. The method of claim 1, wherein the UI further enables the user to configure the topology to include composite devices.

4. The method of claim 1, wherein the UI further enables the user to configure the topology to include abstract devices.

5. The method of claim 1, wherein the scalable layer-2 protocol comprises one from the group including Shortest Path Bridge (SPB), Provider Backbone Bridge (PBB), Virtual Private LAN Service (VPLS), Virtual Extensible LAN (VXLAN) or an OpenFlow-based protocol.

6. A computer-implemented method for allocating physical computing resources in a cloud computing network, the method comprising:

providing an application programming interface (API) based user interface (UI) to users, the API to enable each user to configure a selection of network topology features to define a configured network topology, the UI to enable each user to specify network topology features at the physical device level;

detecting, by the UI, available physical computing resources provisioned by at least one provider for access via the cloud computing network;

mapping, by the UI, the configured network topology to the available physical computing resources in accordance with a scalable Layer-2 protocol;

providing each user access to corresponding mapped physical computing resources as a virtual network; and wherein, for each user, the network topology is based on a preexisting network topology associated with a preexisting virtual network, and the UI enables a user to modify the network topology dynamically.

7. The method of claim 6, wherein the detecting and selectively interfacing is controlled by a marketplace provider via the UI.

8. The method of claim 7, wherein:
providing access of the virtual network to each user is based on a fee;
the one or more providers receiving portions of the fee based on seller-associated physical computing resources mapped to each user-specified topology; and
the marketplace provider receiving a portion of the fee based on a predetermined criteria.

9. The method of claim 7, further comprising:
enabling the creation of virtual devices by each user; and
exposing the created virtual devices as available devices available for a fee to a subsequent user.

10. The method of claim 7, further comprising:
enabling the creation of composite devices by each user; and
exposing the created composite devices as available devices available for a fee to a subsequent user.

11. A nontransitory computer-readable medium storing instructions that, when executed by one or more processors, cause the one or more processors to:
provide a user interface (UI) to enable a user to configure a network topology at a physical device level;
detect, with the UI, available physical computing resources provisioned by at least one provider for access via a cloud computing network;
map, by the UI, the configured network topology to the available physical computing resources in accordance with a scalable Layer-2 protocol;
provide the user access to the mapped physical computing resources as a virtual network; and
wherein the network topology is based on a preexisting network topology associated with a preexisting virtual network, and the instructions further cause the one or more processors to enable a user to modify the network topology dynamically via the UI.

12. The nontransitory computer-readable medium of claim 11, wherein a given network segment is represented by the UI as a connection to a physical device.

13. The nontransitory computer-readable medium of claim 12, wherein the given network segment is further represented by the UI as a connection to a virtual device.

14. The nontransitory computer-readable medium of claim 11, wherein the given network segment may be represented by the UI as a connection to a composite device.

15. The non-transitory computer-readable medium of claim 11, wherein the scalable layer-2 protocol is one from the group comprising Shortest Path Bridge (SPB), Provider Backbone Bridge (PBB), VPLS, VXLAN or an OpenFlow-based protocol.

* * * * *